United States Patent [19]

Ripatonda

[11] Patent Number: 4,821,633
[45] Date of Patent: Apr. 18, 1989

[54] PERFECTED UNIT FOR THE PREPARATION OF A PORTION OF FRIED FOOD, AND FOR THE IMMEDIATE DISTRIBUTION OF THIS FOOD

[76] Inventor: Gilberto Ripatonda, via Quasimodo, 3/A Suzzara, Italy

[21] Appl. No.: 101,147

[22] Filed: Sep. 25, 1987

[30] Foreign Application Priority Data

Feb. 3, 1987 [IT] Italy .................................. 3336 A/87
Jul. 1, 1987 [IT] Italy ...................................... 4909[U]

[51] Int. Cl.$^4$ ............................................ A47J 37/12
[52] U.S. Cl. ........................................ 99/357; 99/407; 99/403; 99/352
[58] Field of Search ................. 99/403, 407, 409, 410, 99/417, 408, 353, 352, 357, 355, 404; 210/DIG. 8

[56] References Cited

U.S. PATENT DOCUMENTS

| | | | |
|---|---|---|---|
| 3,357,341 | 12/1967 | Kocken et al. ...................... | 99/407 |
| 3,448,677 | 6/1969 | Dexters ................................ | 99/407 |
| 3,762,394 | 10/1973 | Newcomer ........................... | 99/408 |
| 4,489,646 | 12/1984 | Schmidt et al. ...................... | 99/407 |

FOREIGN PATENT DOCUMENTS 2000417 1/1970 Fed. Rep. of Germany .

Primary Examiner—Henry J. Recla
Assistant Examiner—Linda J. Sholl
Attorney, Agent, or Firm—Darby & Darby

[57] ABSTRACT

The unit features a metal inner casing within which a deep pan is located, containing a mixture of oils heated, a drainer moving on a horizontal axis, and guiding means for conveying a portion of raw food towards the drainer, which is immersed in the oil mixture, the inner casing being fitted with a window mounted in a door that opens towards the outside of the inner casing, through which the drainer moves, enabling the fried food to be unloaded into a container located in a station that is accessible from outside the unit, and being kept under the action of a depression by a suction means, upstream of which is fitted a means for purifying the greasy fumes given off by the oil.

3 Claims, 3 Drawing Sheets

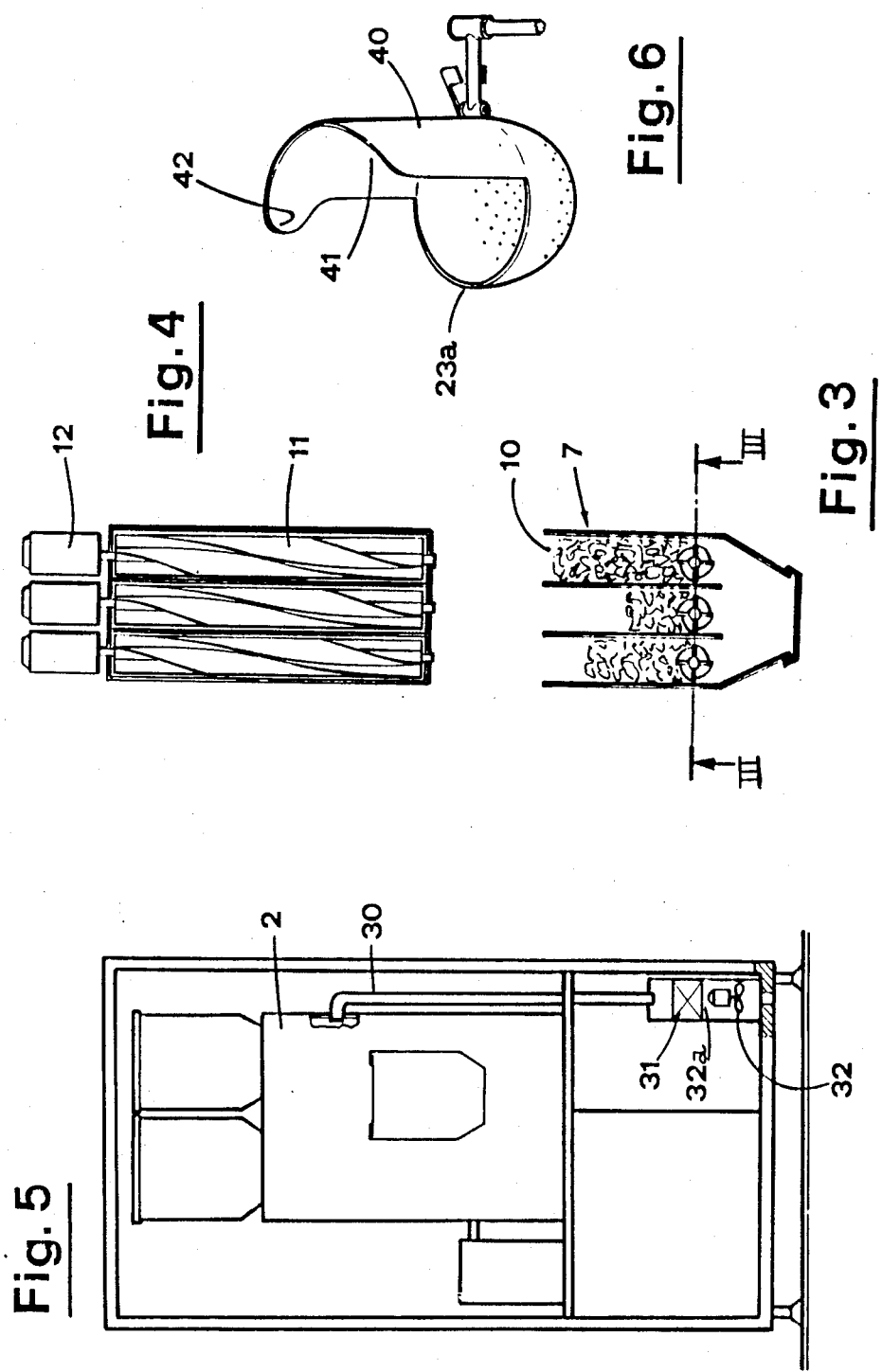

PERFECTED UNIT FOR THE PREPARATION OF A PORTION OF FRIED FOOD, AND FOR THE IMMEDIATE DISTRIBUTION OF THIS FOOD

BACKGROUND OF THE INVENTION

The invention relates to a unit for the preparation of a portion of fried food, and for the immediate distribution of this food.

DESCRIPTION OF THE PRIOR ART

There are units of known type, including: a deep pan (also known as a fryer), designed to contain a suitable mixture of oil that is kept at a preset temperature by means of a heat source (e.g. electrical heating element); a raw food magazine located above the deep pan; a magazine for containers (e.g. of the cup of tub type) in conjunction with which operate first feed means, activated by enabling means that can be operated by the user, and designed to move a container from the latter magazine to a station that is accessible from outside the unit; second feed means, activated by the said enabling means, for drawing a portion of food with a preset weight from the first magazine; guiding means, located in series with the said second feed means, which convey the portion of food drawn from the first magazine towards the said deep pan by means of the action of gravity; a mesh drainer that is made to move in phase with the second feed means, from a lower position, in which it is immersed in the said mixture to receive the above-mentioned portion of food, remaining in this period for a preset period of time sufficient to ensure that the said portion of food is fried correctly, to a raised, forward-inclined position, in order to enable the said portion of fried food to be emptied into the container that is already located in the said station.

The said heated mixture gives off greasy fumes which spread in the atmosphere that surrounds the equipment and thus "pollutes" the air; the said fumes have an unpleasant smell, with all the negative consequences that this involves.

A battery of filters of the "activated carbon" type, located above the deep pan, does not solve the said problem.

In fact, after a relatively short time (e.g. a fraction of an hour) the filters are completely soiled by the greasy fumes and ineffective for the purpose they were designed for: this kind of solution is therefore a palliative only.

In a known technical solution, there is a housing (shaped like a bell) that contains the deep pan, the magazine, the feeder and the aforementioned means; at the station where the container with the fried food is picked up, there is a swinging plate which quite effectively keeps the inside of the housing separate from the outside atmosphere.

The mixture of air and greasy fumes is forced by suitable means to flow in a closed loop inside the housing, through a condenser, located inside the said housing, that is designed to condense the greasy fumes.

Although this solution solves the aforementioned problem, it creates serious difficulties regarding the cleaning and maintenance of the equipment, especially of all the parts contained in the housing.

Said greasy and unpleasant-smelling fumes from coming into contact with the inside surfaces of the unit housing, or the operating means contained within it, including the raw food magazine.

As a result of this the inside surfaces of the housing, and the unit's operating means, become increasingly soiled by the greasy fumes, obliging those running it to put it out of use after a predetermined period of operation, in order to enable the necessary cleaning operations to be carried out, with all the disadvantages and expenses this involves.

In addition to this the greasy fumes also permeate the raw food magazine, making it possible for the raw food to absorb some of the said fumes, with all the obvious disadvantages this involves.

SUMMARY OF THE INVENTION

The object of the invention is to propose a unit for both preparing and immediately distributing a portion of fried food, that is designed in such a way as to eliminate the soiling of the container and raw food magazines, the station that is accessible from outside, and the inside surfaces of the housing, all without having any negative effect on the main operations carried out by the unit itself.

Another object of the invention is to provide equipment that totally prevents the greasy fumes given off by the mixture of heated oils contained in the deep pan from spreading to the outside atmosphere.

The above is obtained by incorporating a metal inner casing in which the deep pan, electric heating means for the oil mixture contained in the deep pan, the mesh drainer and aforementioned guiding means are located; the top part of the inner casing features an opening that is closed off by a hopper that is fitted to the lower part of the raw food magazine: the said hopper operates in conjunction with the said second feed means.

A diaphragm is fixed to the guiding means for conveying the portion of raw food to the deep pan, and is located above the deep pan and inside the inner casing, in such a manner as to shield the hopper from the greasy fumes given off the the oil mixture.

That part of the inner casing facing the station, features a window mounted in a door, the upper edge of which is hinged to the inner casing, turning upwards and outwards from the latter; the drainer passes through this window, striking against the door and causing it to open upwards, whilst moving to its aforementioned raised and forward-inclined position.

The above-mentioned inner casing is connected by a duct to the inlet of a purifier, which is connected in series to the suction mouth of a suction means whose outlet is on the outside of the unit's housing; in this way the inside of the inner casing is kept under the action of a depression in relation to the outside atmosphere.

In this way, the greasy fumes are confined within the inner casing without, however, coming into contact with the raw food magazine, as a result of the special screening action of the aforementioned diaphragm; the said greasy fumes being continuously sent to the purifier.

The aforementioned purifier consists of a heat source, located in the central section of an air-to-air cuntercurrent heat exchanger, designed to cause the combustion of the greasy fumes given off by the heated oil mixture.

The present invention makes it absolutely impossible for any but the inside surfaces of the inner casing located below the diaphragm, and the lower surface of the latter itself, to be soiled by the greasy fumes; the periodic cleaning of these parts is quick and easy, and is simplified by using suitable materials, such as stainless steel, for example.

BRIEF DESCRIPTION OF THE DRAWINGS

The characteristics of the invention are highlighted below with reference to the enclosed tables of drawings, in which:

FIG. 3 shows the cross-section II—II in FIG. 2, concerning a food magazine unit;

FIG. 4 shows cross-section III—III in FIG. 3;

FIG. 5 is a diagram of the circuit maintaining the said inner casing under the action of a depression;

FIG. 6 is a drawing in perspective of the drainer used in the unit;

DESCRIPTION OF THE PREFERRED EMBODIMENT

With reference to the said figures, 1 shows a parallelpiped-shaped housing, one vertical panel 1a of which is hinged such that it is able to turn in relation to a vertical axis: this enables one to gain access to the inside of the housing.

The inside of the said housing supports the means described below.

Figure 2:
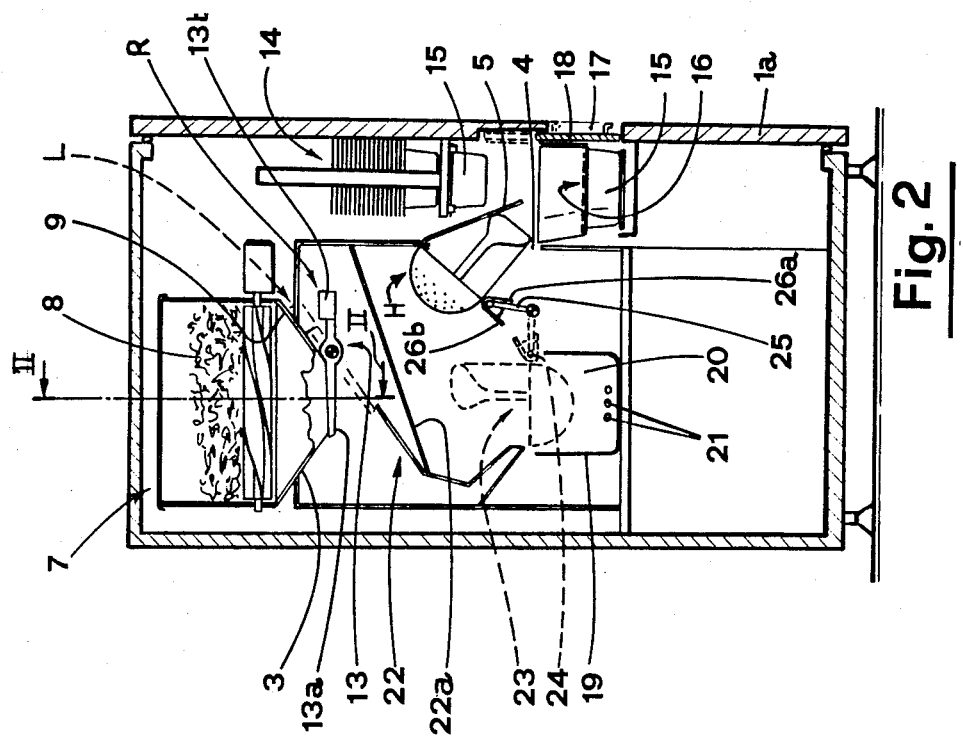
FIG. 2 shows the cross-section I—I in FIG. 1.
Figure 1:
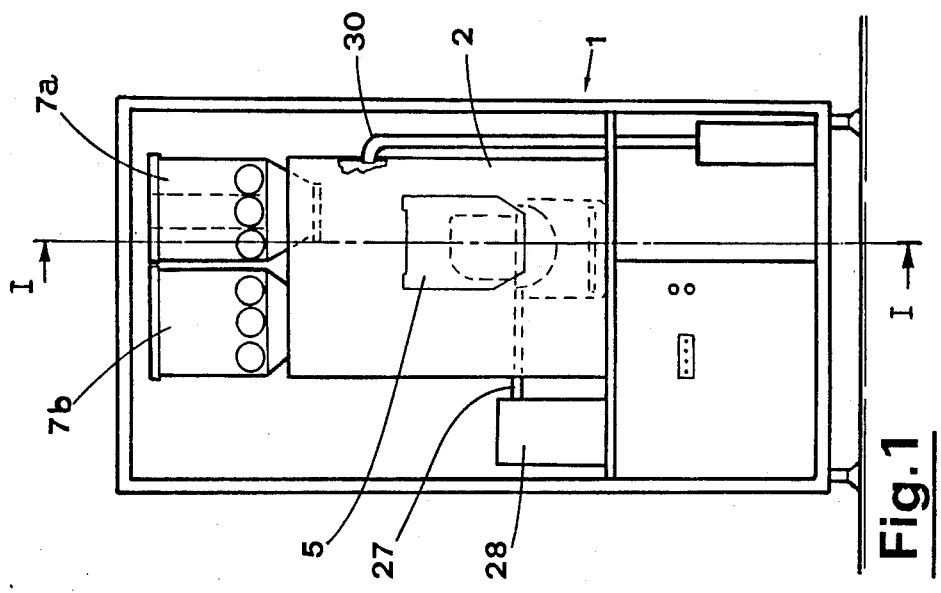
FIG. 1 is a diagram of a vertical cross-section seen from the front of the unit.

A metal inner casing 2, in, for example, stainless steel is located in a central position in relation to the housing, featuring an opening 3 in its top part, and a side window 4; the latter is mounted in a door 5 on the outside of the inner casing, the upper edge of which is hinged to the latter: this enables the door to turn upwards (FIG. 2).

A magazine 7 for raw food 8 is positioned above the inner casing, its lower part being fitted with a hopper 9, located so as to close off the said opening 3.

In the example illustrated, the magazine 7 is composed of two units 7a, 7b located side by side, each of which is composed of container sections 10.

Each section has a parallelpiped shape, is accessible from above so that it can be filled with the raw food 8, and features an auger 11 in its bottom section that can be driven by a related electric motor 12; the screws of the auger are made in synthetic resin and are sufficiently flexible to avoid breaking down the said food.

A balance 13 is located below the hopper portion 9 corresponding to each container zone 10, composed of a lever, the first arm 13a of which constitutes the moveable base of the said hopper portion, whilst the remaining arm is fitted with a counterweight 13b that can be moved along an axis parallel to that of the related arm.

14 shows a magazine of containers 15, located outside the inner casing 2; suitable feed means (not illustrated), activated by enabling means (not illustrated) that can be operated by the user, and which cause the container 15 to be moved to a station 16, located in the same place as the said window 4, but at a lower level than the latter (FIG. 2); the station 16 is accessible from outside through an opening 17, fitted with a slide-up door 18, in the moveable panel 1a of the housing. As is well known to persons skilled in the art, the enabling means comprises an electrical circuit with a coin box or coin checker such as a push-switch (see U.S. Pat. No. 3,448,677) or a coin-operated switch.

A deep pan 19 is located at the bottom of the inner casing 2, containing a suitable mixture of oils 20 that are kept at a preset temperature by means of the heat dissipated by an electric heating element 21 immersed in the said mixture.

Guiding means, shown in a simplified form by 22, are situated above the deep pan inside the inner casing 2; a diaphragm 22a, located immediately below the hopper 9, is fixed to these means.

The said means (FIG. 2) are located after the balance 13 in order to convey a portion of food unloaded from the said balance towards the deep pan by means of the action of gravity.

In the rest position R, the counterweight 13b keeps the arm 13a in a horizontal position, closing off the bottom of the hopper.

When the auger 11 turns, raw food 8 is gradually drawn from the container section 10 served by the auger in question: a portion of food is thus deposited on the arm 13a in such a way that its weight gradually increases.

When the preset weight, adjusted by moving the counterweight 13b, is reached, the arm 13a turns downwards, emptying the portion of food into the aforesaid guiding means 22 (work position L).

A special sensor, (not illustrated in that it is not pertinent to the invention), "detects" when the arm turns, and causes the electric motor 12 to be switched off.

After the balance has unloaded the portion of food it returns to the rest position R. A mesh drainer 23 is joined by a hinge 24 to the end of an arm 25; two stops 26a, 26b allow the drainer to swing by a preset amount in relation to the said arm 25, projection from and fixed to a shaft 27 that extends beyond the inner casing 2, and can be motorised using known means 28, located outside the inner casing; shaft 27 is parallel to the axis of hinge 24.

A curved element 40, forming a channel 41 (perpendicular to the axis of the hinge 24), the concave side of which faces the drainer 23, is fixed to that part of the drainer itself where the hinge 24 is fitted; the edge forming the head of the said element features a protruding part 42.

When the arm 25 is in the horizontal position, the drainer 23 is in the lowered position (determined by stop 26b and stroking against the arm 25 and showed by a broken line on FIG. 2); in the said position, the drainer is itself immersed in the mixture 20 in order to receive the portion of raw food conveyed to the deep pan 19 by means 22.

When the arm 25 turns clockwise, the drainer initially travels in the same direction, striking against the door 5 with its protruding part 42 and lifting it up; when the arm 25 is in the vertical position, the drainer tilts forwards until its upper edge 23a (on the opposite side from element 40) strikes against the inside surface of the inner casing 2 (see raised question position H, [shown by a broken line] in FIG. 2).

The said striking action makes it easier for any particles of fried food to become detached from the drainer: this optimises the unloading of the portion of fried food from the drainer, down channel 41, and into the container 15, already located in station 16.

A purifier (filter) 31 treats the greasy fumes given off by the heated mixture 20; the said purifier being connected on one side to a hose 30, leading inside the inner casing, and on the other to the suction inlet 32a of a suction means 32; the outlet of which is on the outside of the unit's housing.

The suction means 32 thus keeps the inside of the inner casing 2 under the action of a depression, indirectly causing the same effect inside the unit's housing as well.

Purifier 31 consists of a channel 42 with inside it a heating element 43 (heat source) the temperature of which is such as to cause the complete combustion of the greasy fumes; in this way, the flow G2 (air+greasy fumes) that flows out of purifier 31 through channel 42 is free of unpleasant-smelling fumes.

Figure 7:
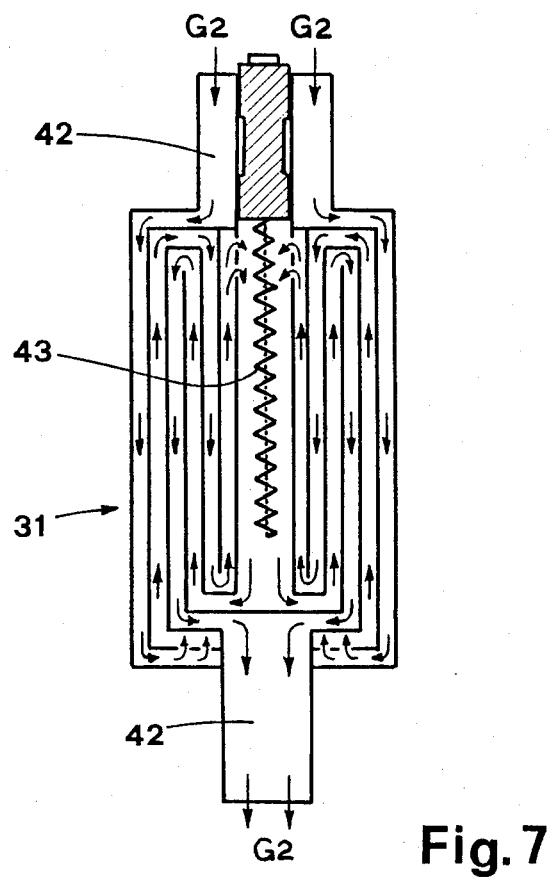
FIG. 7 shows a schematic enlargement of the purifier 31 illustrated in FIG. 5.

At the exit of channel 42, there is a heat exchanger, for example of the countercurrent, air-to-air type (see FIG. 7), to lower the temperature of flow G2.

When it is downstream of heating element 43, flow G2 surrenders heat (thus becoming cooler) to the flow G2 that is flowing in channel 42 upstream of the said heating element; this has a twofold purpose: firstly to lower the temperature of G2 flowing into the atmosphere and raising the temperature of flow G2 upstream of the heating element; the advantage of the latter point being to compensate for the power dissipated by the heating element.

The operation of the unit can be immediately understood from the above description:

The user operates the above enabling means (by, for example, inserting one or more coins in a suitable coin box, not illustrated); this starts the feed means fitted to magazine 14, as well as the motor 12 fitted to container section 10, holding the food the user has selected.

A portion of raw food is conveyed into the deep pan 19, or, more exactly, the drainer 23; the drainer remains in the lowered position for sufficient time to ensure that the food is fried correctly.

When this period of time has elapsed, the shaft 27 is driven by the motor so that the portion of fried food can be emptied into the container 15, already located beneath the station 16.

The greasy and unpleasant-smelling fumes given off during frying are, as a result of the action of the suction means 32, conveyed to the purifier 31; it should be emphasised that the said fumes do not reach the hopper 9, due to the screening action of the diaphragm 22a.

The fumes do not come into contact with, and thus do not soil the magazine 14, the station 16 and, in general, all the means located outside the inner casing 2, (the inside surfaces of the housing in particular).

Only the inside surfaces of the inner casing 2 that are located below the diaphragm 22a, and the lower surface of the latter, become increasingly soiled through contact with the greasy fumes; these present a limited surface area for cleaning, which is furthermore facilitated by the fact that stainless steel is used, thus involving much lower costs that those required for cleaning known units performing the same function as the unit described above.

It is to be understood that the description supplied herein is solely an unlimited example and not binding, such that possible variations in the construction details will not effect the protective framework afforded to the invention as described above and claimed hereinafter.

What is claimed is:

1. A perfected unit for the preparation of a portion of fried food, and for the immediate distribution of this portion comprising a parallelepiped-shaped housing, with at least one vertical panel that is hinged so as to turn in relation to a vertical axis, said housing supporting within it, respectively: a metal inner casing featuring an opening in its top part, and a window in a side with a door; a deep pan, located at the bottom of said inner casing, containing a mixture of oils that is kept at a preset temperature by means of a heat source; a first magazine for raw food, positioned above said inner casing, and fitted with a hopper below, that is located so as to close off said opening; positioned within said inner casing is; a diaphragm located above said deep pan and below said hopper to screen said hopper from greasy fumes given off by said mixture of heated oils; connected to said diaphragm is a means for guiding said raw food from said hopper to said deep pan; a second magazine for containers, located outside said inner casing, said containers being designed to be moved from said second magazine to a station located by a side of said opening accessible from outside said unit; second feed means for feeding a portion of said raw food from said first magazine to said deep pan; a mesh drainer able to receive said portion of food to be fried and subsequently to empty the fried food into said container located in said station; a purifier including an electrical heating element for burning said greasy fumes said purifier being located outside said inner casing, to which it is connected by ducting; and a suction means, having a suction mouth which is connected to said purifier, and having an outlet which passes outside said housing; said purifier and suction means preventing the greasy fumes from contaminating portion of the housing outside of the inner casing.

2. A perfected unit as in claim 1 wherein said electrical heating element is integrated with a heat exchanger designed to increase the temperature of said fumes upstream of said electric heating element and to decrease the temperature of said fumes downstream of said electric heating element.

3. A perfected unit as in claim 2 wherein said electric heating element is located in a central section of an air-to-air, countercurrent heat exchanger.

* * * * *